(12) United States Patent
Kim et al.

(10) Patent No.: US 12,257,605 B2
(45) Date of Patent: Mar. 25, 2025

(54) CLASSIFICATION DEVICE AND CLASSIFICATION SYSTEM FOR SORTING AND CLASSIFYING LED LIGHTING ACCORDING TO FORM OF HOUSING THROUGH VISION RECOGNITION FROM LED-MIXED WASTE LIGHTING HAVING DIFFERENT FORMS OF HOUSING

(71) Applicant: SUNGEEL HIMETAL CO., LTD., Gunsan-si (KR)

(72) Inventors: In Tae Kim, Gunsan-si (KR); Hyun Jin Sung, Gunsan-si (KR); Jong Sik An, Gunsan-si (KR); Ho Sang Yoon, Gangnam-gu Seoul (KR)

(73) Assignee: SUNGEEL HIMETAL CO., LTD., Gunsan-si (CN)

( * ) Notice: Subject to any disclaimer, the term of this patent is extended or adjusted under 35 U.S.C. 154(b) by 0 days.

(21) Appl. No.: 18/948,355

(22) Filed: Nov. 14, 2024

(65) Prior Publication Data
US 2025/0065375 A1     Feb. 27, 2025

Related U.S. Application Data

(63) Continuation of application No. PCT/KR2023/018392, filed on Nov. 15, 2023.

(30) Foreign Application Priority Data

Dec. 7, 2022 (KR) .......................... 10-2022-0169387

(51) Int. Cl.
*B07C 5/342*     (2006.01)

(52) U.S. Cl.
CPC .... *B07C 5/3422* (2013.01); *B07C 2501/0063* (2013.01)

(58) Field of Classification Search
CPC ......... B07C 5/34; B07C 5/342; B07C 5/3422; B07C 2501/0063
(Continued)

(56) References Cited

FOREIGN PATENT DOCUMENTS

| JP | H09-109075 A | 4/1997 |
|---|---|---|
| KR | 10-2012-0033610 A | 4/2012 |

(Continued)

OTHER PUBLICATIONS

International Search Report dated Feb. 20, 2024 issued in PCT/KR2023/018392.

*Primary Examiner* — Terrell H Matthews
(74) *Attorney, Agent, or Firm* — Scully, Scott, Murphy & Presser, P.C.

(57) ABSTRACT

A classification device and classification system for sorting and classifying bulb-type LED lighting through vision recognition from LED-mixed waste lighting having different forms of housing are provided. The classification device including: an input conveyor configured to move a plurality of LED-mixed waste lighting; a sensing part configured to obtain images of the LED-mixed waste lighting moving along a path of the input conveyor using a plurality of cameras; an analysis part configured to search for bulb-type LED lighting from the images obtained from the sensing part using an algorithm for image classification and recognition; a computation unit configured to calculate X, Y, and Z coordinate positions of an object classified as bulb-type LED lighting in the analysis part; and a conveying part configured to pick up and convey the object with the X, Y and Z coordinates calculated by the computation unit to a classifying conveyor.

20 Claims, 3 Drawing Sheets

(58) Field of Classification Search
USPC .................................................. 209/576, 577
See application file for complete search history.

(56) References Cited

FOREIGN PATENT DOCUMENTS

| | | | | |
|---|---|---|---|---|
| KR | 101270354 | B1 | * | 2/2013 |
| KR | 10-1375514 | B1 | | 3/2014 |
| KR | 10-1430527 | B1 | | 9/2014 |
| KR | 101540707 | B1 | * | 10/2014 |
| KR | 102222176 | B1 | * | 7/2020 |
| KR | 102696029 | B1 | * | 9/2022 |
| KR | 10-2541180 | B1 | | 6/2023 |
| TR | 201900696 | A2 | * | 3/2019 |
| TR | 201916521 | A2 | * | 3/2020 |

* cited by examiner

CLASSIFICATION DEVICE AND CLASSIFICATION SYSTEM FOR SORTING AND CLASSIFYING LED LIGHTING ACCORDING TO FORM OF HOUSING THROUGH VISION RECOGNITION FROM LED-MIXED WASTE LIGHTING HAVING DIFFERENT FORMS OF HOUSING

TECHNICAL FIELD

The present invention relates to a classification device and a classification system for sorting and classifying bulb-type LED lighting with high accuracy through vision recognition from LED-mixed waste lighting, including bulb-type LED lighting, but having different forms of housing.

BACKGROUND

In general, end-of-life waste fluorescent lamps are hazardous household waste containing harmful substances such as mercury, and incineration or landfill disposal may cause serious environmental pollution. Therefore, to prevent the release of harmful gases or hazardous dust, such as mercury harmful to the human body, into the atmosphere, automatic recycling system equipment is provided that first cuts the base socket, which is the metal terminal portion at both ends of the waste fluorescent lamp, with a cutting machine, through a waste fluorescent lamp recycling treatment system, then crushes it to process to classify the metal terminals. Secondly, the finely crushed glass powder from the waste fluorescent lamp is separately heated in a heating device, where hazardous dust and harmful gases such as vaporized mercury are separated. In this case, the harmful gases such as vaporized mercury are collected in a mercury distillation device for recycling.

Meanwhile, the use of LED lighting, which consumes less power and does not generate mercury waste, has recently been rapidly increasing.

This LED lighting may be divided into bulb-type LED lighting, tube-type LED lighting, and others, depending on the form of housing. Currently, LED lighting with various forms of housing is being produced, and the fastening structures between components differ for each form of LED lighting.

According to the data released by the Ministry of Environment, the estimated amount of domestic LED waste lighting in Korea is expected to increase from 163,000 tons in 2020 to 723,000 tons by 2030.

In this situation, due to the inadequate system for collecting end-of-life LED-mixed waste lighting, as well as the insufficient classification standards and pre-treatment technologies for recycling, such waste is being either landfilled, incinerated, or exported abroad. When landfilled or incinerated, it leads to environmental burden issues, and when exported abroad, it results in the outflow of metal resources used in LED-mixed waste lighting.

In particular, due to the lack of established pre-treatment technologies for classification, disassembly, LED chip separation, and valuable metal sorting that take into account the form of housing and type of LED lighting, only the socket part of LED-mixed waste lighting is separated, and the rest is uniformly crushed. As a result, fine powders such as plastic and glass become mixed with metal components, making it difficult to sort and classify them.

Therefore, it is necessary to establish a system for collecting and recycling LED-mixed waste lighting, and to apply optimal disassembly and separation technologies to the classified LED-mixed waste lighting to build an automated plant for recycling LED mixed waste lighting.

The present invention is directed to providing a classification device and a classification system for automatically sorting and separating bulb-type LED lighting from remaining forms of LED lighting through vision recognition from LED-mixed waste lighting having different forms of housing.

Technical problems to be solved by the present invention are not limited to the above-mentioned technical problem(s), and other technical problem(s), which are not mentioned above, may be clearly understood by those skilled in the art from the following descriptions.

SUMMARY

In order to achieve the aforementioned object, the present invention is directed to providing a classification device for sorting and classifying LED lighting according to form of housing through vision recognition from LED-mixed waste lighting having different forms of housing, the classification device including: an input conveyor configured to move a plurality of LED waste lighting, including bulb-type LED lighting, but having different forms of housing; a sensing part configured to obtain images of the LED waste lighting moving along a path of the input conveyor using a plurality of cameras; an analysis part configured to search for bulb-type LED lighting from the images obtained from the sensing part using an algorithm for image classification and recognition; a computation unit configured to calculate X, Y, and Z coordinate positions of an object classified as bulb-type LED lighting in the analysis part; and a conveying part configured to pick up and convey the object with the X, Y and Z coordinates calculated by the computation unit to a classifying conveyor, in which the bulb-type LED lighting and remaining types of LED lighting may be automatically sorted and separated.

In order to achieve the aforementioned object, in the classification device according to an embodiment of the present invention, there is provided a classification system for sorting and classifying LED lighting according to form of housing through vision recognition from LED-mixed waste lighting having different forms of housing, in which LED waste lighting, excluding bulb-type LED lighting conveyed to the classifying conveyor, among the LED-mixed waste lighting moving along the path of the input conveyor, may be moved to a manual disassembly process.

In order to achieve the aforementioned object, the present invention provides a classification method of sorting and classifying LED lighting according to form of housing through vision recognition from LED-mixed waste lighting having different forms of housing, the classification method including: obtaining captured images of LED waste lighting using a plurality of cameras while moving the plurality of LED waste lighting, including bulb-type LED lighting, but having different forms of housing, along a path of an input conveyor (S10); searching for bulb-type LED lighting from the obtained images using an algorithm for image classification and recognition (S20); obtaining X and Y coordinate positions of an object classified as bulb-type LED lighting (S30); obtaining a Z coordinate of the object using the X and Y coordinates of the object (S40); and transferring the obtained X, Y and Z coordinates of the object to a conveying part to pick up the object with the X, Y and Z coordinates and convey the object to a classifying conveyor (S50).

Advantageous Effects

According to the classification device and classification system for sorting and classifying LED lighting according to form of housing through vision recognition from LED-mixed waste lighting having different forms of housing, it is possible to automate the classification of bulb-type LED lighting and other forms of LED lighting from LED-mixed waste lighting including bulb-type LED lighting and LED lighting having a form of housing other than bulb-type, and to increase the accuracy of the classification system.

In addition, by automatically classifying LED-mixed waste lighting according to the form of housing of LED lighting, it is possible to build an integrated recycling plant for disassembly, separation, sorting, and the like of the classified LED lighting in the future.

DETAILED DESCRIPTION

It should be understood that before describing the present invention in detail, the terms and words used in the present specification are not to be interpreted unconditionally and without limitation in the general or dictionary meaning, and that the inventor of the present invention may appropriately define and use the concepts of various terms to best describe his/her own invention, and further that these terms and words are to be interpreted in a meaning and concept consistent with the technical spirit of the present invention.

That is, it should be understood that the terms used in the present specification are used only to describe preferred embodiments of the present invention and are not intended to specifically limit the content of the present invention, and that these terms are terms defined in consideration of the various possibilities of the present invention.

In addition, in the present specification, it should be understood that singular expressions may include plural expressions unless the context clearly indicates a different meaning, and similarly, the plural expressions may have a singular meaning.

Throughout the present specification, where a constituent element is described as "comprising/including" another element, which, unless specifically stated to the contrary, may mean to include any other constituent element and not to exclude any other constituent element.

In addition, in describing the present invention below, detailed descriptions of the configuration, for example, of known art, including prior art, may be omitted where it is determined that such descriptions would unnecessarily obscure the subject matter of the present invention.

Figure 1:
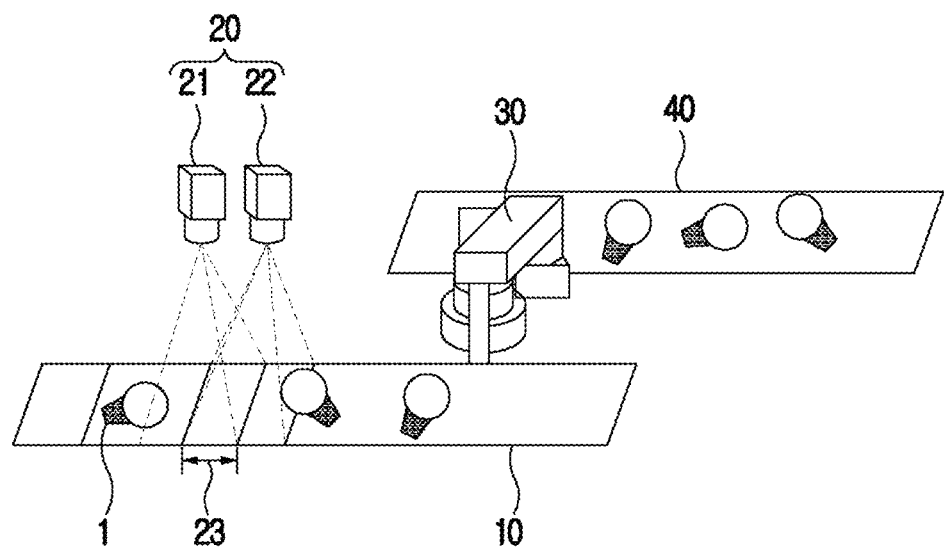
FIG. 1 is a schematic view of a classification device according to form of LED-mixed waste lighting, in an embodiment of the present invention.
Figure 2:
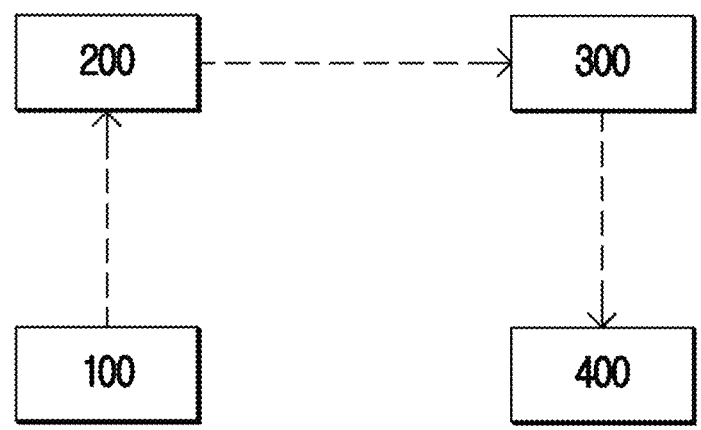
FIG. 2 illustrates an electrical signal transmission path between a sensing part, an analysis part, a computation unit, and a conveying part, in an embodiment of the present invention.

Hereinafter, the present invention will be described in more detail with reference to FIGS. 1 to 3 below for assisting in understanding of the present invention.

According to the present invention, there is provided a classification device for sorting and classifying LED lighting according to form of housing through vision recognition from the LED-mixed waste lighting 1 having different forms of housing. The classification system may include an input conveyor 10 configured to move a plurality of LED-mixed waste lighting 1, including bulb-type LED lighting, but having different forms of housing; a sensing part 100 configured to obtain images of the LED-mixed waste lighting 1 moving along a path of the input conveyor 10 using a plurality of cameras 20; an analysis part 200 configured to search for bulb-type LED lighting from the images obtained from the sensing part 100 using an algorithm for image classification and recognition; a computation unit 300 configured to calculate X, Y, and Z coordinate positions of an object classified as bulb-type LED lighting in the analysis part 200; and a conveying part 400 configured to pick up and convey the object with the X, Y and Z coordinates calculated by the computation unit 300 to a classifying conveyor 40.

In an embodiment of the present invention, the input conveyor 10 may be a means for automatically moving the LED-mixed waste lighting 1.

The LED-mixed waste lighting 1 may further include bulb-type LED lighting and, in addition to the bulb-type LED lighting, at least one type of lighting selected from the group consisting of tube-type LED lighting, flat-type LED lighting, cross-type LED lighting, and disk-type LED lighting. Here, as examples of lighting included in the LED-mixed waste lighting 1 in addition to bulb-type LED lighting, tube-type LED lighting, flat-type LED lighting, cross-type LED lighting, and disk-type LED lighting are mentioned. However, the lighting included in the LED-mixed waste lighting 1 is not limited thereto, and may include all LED lighting having various forms of housing that have reached the end of their life cycle and are discarded.

A width of the conveyor is not particularly limited, but may be, for example, 500 mm to 3,000 mm, 800 mm to 2,000 mm, or 800 mm to 1,200 mm.

A height of the conveyor is not particularly limited, but may be, for example, 400 mm to 2,500 mm, 500 mm to 2,000 mm, or 800 mm to 1,000 mm.

In an embodiment of the present invention, the sensing part 100 may include the plurality of cameras 20 installed at predetermined intervals along the path of the input conveyor.

The plurality of cameras 20 may be installed at predetermined intervals along the path of the input conveyor 10 so that their fields of view overlap between adjacent cameras 20.

The field of view (FOV) of the camera 20 may be suitably adjusted according to the width and height of the input conveyor 10. For example, the field of view (FOV) of the camera 20 is an area of 800 mm to 1,200 mm in width and 500 mm to 900 mm in height, in which case an interval 23 between the cameras may be 300 mm to 450 mm. Specifically, in order to obtain images of the LED-mixed waste lighting 1 being conveyed along the path of the input conveyor 10 to form an overlap area, the field of view of the camera 20 is an area of 900 mm to 1,200 mm or 1,000 mm to 1,100 mm in width and 600 mm to 800 mm or 700 mm to 800 mm in height. The camera 20 may be installed every 300 mm to 450 mm, more specifically every 350 mm to 400 mm, of a conveyance distance of the LED-mixed waste lighting 1.

A working distance WD from the LED-mixed waste lighting 1 moving along the path of the input conveyor 10 to a lens of the camera 20 may be designed to be 1,500 mm or less, preferably 1,000 mm to 1,500 mm, more preferably 1,350 mm to 1,450 mm, in consideration of the design of the height of the conveyor and a height of a frame for external light shielding.

The plurality of cameras 20 may be installed in an alternating pattern of a 2D camera 21 and a stereo depth camera 22. Therefore, accurate X, Y, and Z coordinate positions of the bulb-type LED lighting as an object in the computation unit 300 may be obtained.

The sensing part 100 may further include an adjustment part configured to adjust positions, directions, and heights of the plurality of cameras 20, and a controller configured to control the camera 20 and the adjustment part, and to transmit a trigger signal to the camera 20.

Through the adjustment part, the plurality of cameras 20 may be adjusted in position so that the field of view overlaps between adjacent cameras 20, the lenses of the cameras 20 may be adjusted to face the conveyor, and a height for controlling a working distance from the LED-mixed waste lighting 1 to the lenses of the cameras 20 may be adjusted.

The controller may be a programmable logic controller (PLC).

The controller transmits a trigger signal to the camera 20, and a time interval of the trigger signal may be adjustable in consideration of a conveyor speed, and may be, for example, 50 msec to 200 msec, 80 msec to 150 msec, or 100 msec to 120 msec.

The camera 20 that has received the trigger signal from the controller may capture and transmit the image to a storage space to store the image.

In an embodiment of the present invention, the analysis part 200 may search for bulb-type LED lighting from an entire image obtained from the sensing part 100 using an algorithm for image classification and recognition.

The bulb-type LED lighting may have an image that has a circular shape on one side and a socket shape on the other side.

The analysis part may use a convolutional neural network (CNN) optimized for image classification and recognition. As a specific example, the analysis part 200 may use python, which is a programming language with an interpreter method, to implement the CNN, and may use one of Keras, TensorFlow, and Theano, which are open source libraries, specifically Keras, to build the neural network. This may lead to improved image sorting capability for bulb-type LED lighting.

The image classified as bulb-type LED lighting in the analysis part 200 may be selected as an object for conveyance to the classifying conveyor 40 in the conveying part 400.

In an embodiment of the present invention, the computation unit 300 may calculate X, Y, and Z coordinate positions of an object classified as a bulb-type LED lighting in the analysis part 200.

As a specific example, the computation unit 300 may include a first computation unit 300 configured to obtain X and Y coordinate positions of an object by mapping an image obtained from the 2D camera 21 through a real coordinate system and returning a center point of a circular shape excluding a socket of bulb-type LED lighting, and a second computation unit 300 configured to obtain a Z coordinate of the object by obtaining a 3D image from the stereo depth camera 22 with respect to the X and Y coordinates of the object obtained from the first computation unit 300.

When the image obtained from the 2D camera 21 is mapped through a real coordinate system in the first computation unit 300, the coordinate system may be set in a unit of mm.

In addition, in the first computation unit 300, the center point of the circular shape, excluding the socket of bulb-type LED lighting, may refer to a highest point of the circular shape.

In the second computation unit 300, a height of the object may be calculated by obtaining a 3D image with respect to the X and Y coordinates of the object obtained in the first computation unit, and the Z coordinate may be returned through a 3D depth calculation using stereo vision.

The X, Y and Z coordinates of the object obtained above may be transferred to the conveying part 400.

In an embodiment of the present invention, the conveying part 400 may be a means for picking up and conveying the object with X, Y and Z coordinates calculated by the computation unit 300 to the classifying conveyor 40. Specifically, the X, Y and Z coordinates of the object are transferred to the conveying part 400, and the object may be picked up by a conveying unit 30 of the conveying part 400 and conveyed to the classifying conveyor 40.

The conveying unit 30 may be a SCARA robot. For example, the conveying unit 30 may include a body, an arm portion including at least one arm connected to the body and rotating about a vertical axis, a lift bar connected to the arm portion and moving up and down, an actuator to lift the lift bar, and an adsorption portion connected to a lower end of the lift bar and being lifted with the lift bar.

The arm portion may include a first arm connected to the body and rotating about the vertical axis, and a second arm connected to the first arm and rotating about the vertical axis, and the lift bar may be connected to the second arm.

the actuator may be a drive cylinder. In addition, the actuator may assist in the formation of a vacuum pressure for adsorption of the object on the adsorption portion.

A bottom surface of the adsorption portion may be provided with an adsorption plate for adsorbing the object.

This may allow the conveying unit 30 to vacuum adsorb and pick up the object and convey the object to the classifying conveyor 40.

In an embodiment of the present invention, LED waste lighting other than the bulb-type LED lighting conveyed to the classifying conveyor 40 among the LED-mixed waste lighting 1 moving along the path of the input conveyor 10 may be moved to a manual disassembly process.

According to the present invention, there is provided a classification system for sorting and classifying LED lighting according to form of housing through vision recognition from LED-mixed waste lighting 1 having different forms of housing. The classification system may include: obtaining captured images of LED-mixed waste lighting 1 using a plurality of cameras 20 while moving the plurality of LED-mixed waste lighting 1, including bulb-type LED lighting, but having different forms of housing, along a path of an input conveyor 10 (S10); searching for bulb-type LED lighting from the obtained images using an algorithm for image classification and recognition (S20); obtaining X and Y coordinate positions of an object recognized as bulb-type LED lighting (S30); obtaining a Z coordinate of the object using the X and Y coordinates of the object (S40); and transferring the obtained X, Y and Z coordinates of the object to a conveying part 400 to pick up the object with the X, Y and Z coordinates and convey the object to a classifying conveyor 40 (S50).

In an embodiment of the present invention, the classification system may be a system for sorting and classifying LED lighting according to form of housing through vision recognition from LED-mixed waste lighting 1 having different forms of housing using the classification device described above.

According to an embodiment of the present invention, step S10 may be a step of inputting the LED-mixed waste lighting 1 into the input conveyor 10 and obtaining images using the sensing part 100 provided with the plurality of cameras 20 for each of the LED-mixed waste lighting 1 moving along the path of the input conveyor 10.

The plurality of cameras 20 may be installed in an alternating pattern of a 2D camera 21 and a stereo depth camera 22, so that both 2D images and 3D images of the LED-mixed waste lighting 1 may be obtained.

The plurality of cameras 20 may set a capture mode with an external trigger.

In the adjustment part of the sensing part 100, a position may be adjusted by adjusting the positions, directions, and heights of the plurality of cameras 20 so that the fields of view between adjacent cameras 20 overlap, the lenses of the cameras 20 may be adjusted to face the conveyor, and a height for controlling a working distance from the LED-mixed waste lighting 1 to the lenses of the cameras 20 may be adjusted.

The sensing part 100 may include a controller using a programmable logic controller (PLC), and the PLC may transmit a trigger signal at predetermined intervals of the input conveyor 10 in which a servomotor and an encoder are interlocked, and the camera 20 that has set the capture mode with an external trigger may capture an image upon receiving a signal from the PLC and transmit the image to the storage space (buffer).

In an embodiment of the present invention, step S20 may be a step of classifying bulb-type LED lighting from the images obtained for each of the LED-mixed waste lighting 1 in step S10 using an algorithm for image classification and recognition, and recognizing the bulb-type LED lighting as an object.

Specifically, an image having a circular shape on one side and a socket shape on the other side may be classified into bulb-type LED lighting and recognized as an object.

As the algorithm in step 20, the analysis part 200 may use a convolutional neural network (CNN) optimized for image classification and recognition. As a specific example, the neural network may be configured using Python, which is a programming language with an interpreter method, and Keras, which is an open source library, to implement the CNN.

In an embodiment of the present invention, step S30 may be a step for obtaining X and Y coordinate positions of the object recognized as bulb-type LED lighting in step S20.

Specifically, the X and Y coordinate positions of the object may be obtained by mapping the image obtained from the 2D camera 21 through a real coordinate system that is set in a unit of mm, and returning a center point of a circular shape excluding a socket portion of the bulb-type LED lighting. Here, the center point of the circular shape, excluding the socket of bulb-type LED lighting, may refer to a highest point of the circular shape.

In an embodiment of the present invention, step S40 may be a step of obtaining a Z coordinate of the object using a 3D image with respect to the X and Y coordinates of the object obtained in step S30.

Specifically, the height of the object may be calculated by obtaining a 3D image from the stereo depth camera 22 with respect to the X and Y coordinates of the object, and the Z coordinate may be obtained through a 3D depth calculation using stereo vision.

In an embodiment of the present invention, step S50 may be a step of transferring the X, Y and Z coordinates of the object obtained in steps S30 and S40 to the conveying part 400, thereby picking up and transferring the object with the X, Y and Z coordinates to the classifying conveyor 40 for classification.

Specifically, the conveying unit 30 may be allowed to move to the X, Y and Z coordinates of the object transferred to the conveying part 400, and the object with the X, Y and Z coordinates may be picked up and transferred to the classifying conveyor 40.

The conveying unit 30 may be a SCARA robot including a body, a first arm connected to the body and rotating about a vertical axis, a second arm connected to the first arm and rotating about the vertical axis, a lift bar connected to the second arm and moving up and down, an actuator to lift the lift bar, and an adsorption portion connected to a lower end of the lift bar and lifting with the lift bar, and may pick up an object with the adsorption portion and convey the object to the classifying conveyor 40.

While the apparatus and system for classifying LED-mixed waste lighting according to the present invention have been described and illustrated in the drawings, only the essential configurations for understanding the present invention have been described and illustrated in the description and drawings, and in addition to the processes and devices described and illustrated in the description and drawings, processes and devices not separately described and illustrated may be suitably applied and used to practice the present invention.

Hereinafter, the present invention will be described in more detail with reference to examples. However, the following examples are intended to illustrate the present invention and it will be apparent to those skilled in the art that various changes and modifications are possible within the scope and spirit of the present invention, and these alone do not limit the scope of the present invention.

EXAMPLE 1

Figure 3:
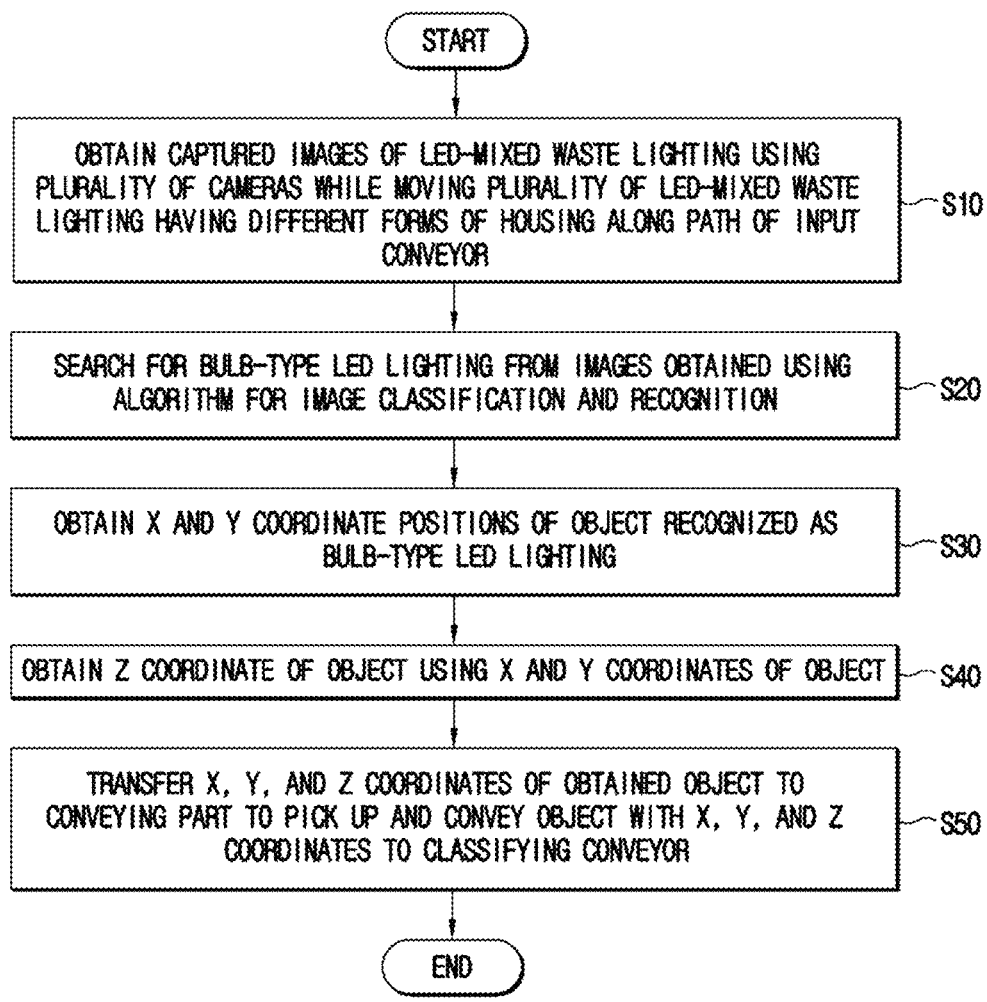
FIG. 3 is a flowchart of the classification system according to form of LED-mixed waste lighting, in an embodiment of the present invention.

LED-mixed waste lighting was processed to be classified as shown in the flowchart of FIG. 3 below using the classification device for sorting and classifying LED lighting according to form of housing through vision recognition from LED-mixed waste lighting having different forms of housing in FIG. 1 below.

Before the classification process, the width of the input conveyor was configured to be 1,000 mm, the field of view of the camera was set to the conveyor area of 1000 mm in width and 750 mm in height, and an image of 1000 mm×750 mm was obtained for every conveyance distance of 375 mm of LED-mixed waste lighting to form an overlap area.

In addition, the working distance of the camera was set to 1,350 mm to 1,450 mm from the object to the camera lens in consideration of the design of the height of the conveyor of 800 mm to 1000 mm and the height of the frame for external light shielding.

The LED mixed waste lighting was input into the input conveyor, and a trigger signal of 100 msec was transmitted to the camera every predetermined section of the conveyor in which the servo motor and encoder were interlocked using a programmable logic controller (PLC), and the camera set the capture mode with an external trigger to capture and transmit an image to the buffer upon receiving a signal from the PLC.

Then, bulb-type LED lighting was searched for in the obtained entire image area. Specifically, it was confirmed that a socket image was formed in one direction of the circular shape, which uses a convolutional neural network (CNN) optimized for image classification and recognition, and was performed using Keras library and Python language.

Then, the X and Y coordinate positions of the recognized bulb-type LED lighting were calculated as a pickup object. Specifically, the X and Y coordinate positions as an object were obtained by mapping the obtained image through a real coordinate system (in a unit of mm) and returning the center (highest point) of the circular shape excluding the socket portion of the bulb-type LED lighting.

Then, to obtain the height of the object for pickup using SCARA robot, a 3D image was obtained with respect to the X and Y coordinates of the object using stereo cameras. Specifically, the height of the object was calculated and the Z coordinate was returned through the 3D depth calculation using stereo vision.

Then, the X, Y and Z coordinates of the object were transferred to SCARA robot, and the object was picked up through vacuum adsorption and moved to the classifying conveyor.

By repeating the steps described above, the bulb-type LED lighting was sorted from the LED-mixed waste lighting and conveyed to the classifying conveyor, while the LED lighting having the remaining forms of housing was conveyed to the manual disassembly process along the path of the input conveyor.

DESCRIPTION OF REFERENCE NUMERALS

1: LED-mixed waste lighting
10: Input conveyor
20: Camera
21: 2D Camera
22: Stereo depth camera
23: Interval between cameras
30: Conveying unit
40: Classifying conveyor
100: Sensing part
200: Analysis part
300: Computation unit
400: Conveying part

INDUSTRIAL APPLICABILITY

The present invention may be used in a classification device and classification system for sorting and classifying bulb-type LED lighting from LED-mixed waste lighting.

The invention claimed is:

1. A classification device for sorting and classifying LED lighting according to form of housing through vision recognition from LED-mixed waste lighting having different forms of housing, the classification device comprising:
   an input conveyor configured to move a plurality of LED-mixed waste lighting, including bulb-type LED lighting, but having different forms of housing;
   a sensing part configured to obtain images of the LED-mixed waste lighting moving along a path of the input conveyor using a plurality of cameras;
   an analysis part configured to search for bulb-type LED lighting from the images obtained from the sensing part using an algorithm for image classification and recognition;
   a computation unit configured to calculate X, Y, and Z coordinate positions of an object classified as bulb-type LED lighting in the analysis part; and
   a conveying part configured to pick up and convey the object with the X, Y and Z coordinates calculated by the computation unit to a classifying conveyor,
   wherein the bulb-type LED lighting and remaining types of LED lighting are automatically sorted and separated.

2. The classification device of claim 1, wherein the LED-mixed waste lighting further includes bulb-type LED lighting and, in addition to the bulb-type LED lighting, at least one type of lighting selected from the group consisting of tube-type LED lighting, flat-type LED lighting, cross-type LED lighting, and disk-type LED lighting.

3. The classification device of claim 1, wherein the plurality of cameras is installed at predetermined intervals along the path of the input conveyor so that fields of view between adjacent cameras overlap.

4. The classification device of claim 3, wherein the field of view of the camera is adjusted according to a width and a height of the input conveyor.

5. The classification device of claim 4, wherein the width of the field of view of the camera is formed of 800 mm to 1,200 mm, and the height of the field of view of the camera is formed of 500 mm to 900 mm.

6. The classification device of claim 4, wherein the camera is installed every 350 mm to 400 mm of a conveyance distance of the LED-mixed waste lighting, and
   wherein a working distance from the LED-mixed waste lighting to a lens of the camera is designed to be 1,350 mm to 1,450 mm.

7. The classification device of claim 3, wherein the plurality of cameras is installed in an alternating pattern of a 2D camera and a stereo depth camera.

8. The classification device of claim 1, wherein the sensing part includes:
   an adjustment part configured to adjust positions, directions, and heights of a plurality of cameras; and
   a controller configured to control the camera and the adjustment part, and to transmit a trigger signal to the camera.

9. The classification device of claim 8, wherein the controller is formed as a programmable logic controller (PLC).

10. The classification device of claim 8, wherein the camera, upon receiving a trigger signal from the controller, captures an image and transmits the image to a storage space.

11. The classification device of claim 10, wherein a time interval of the trigger signal is formed of 50 msec to 200 msec.

12. The classification device of claim 1, wherein the analysis part uses a convolutional neural network (CNN).

13. The classification device of claim 4, wherein the computation unit includes:
   a first computation unit configured to obtain X and Y coordinate positions of an object by mapping an image obtained from the 2D camera through a real coordinate system and returning a center point of a circular shape excluding a socket of bulb-type LED lighting; and
   a second computation unit configured to obtain a Z coordinate of the object by obtaining a 3D image from the stereo depth camera with respect to the X and Y coordinates of the object obtained from the first computation unit.

14. The classification device of claim 13, wherein the center point of the circular shape excluding the socket of the bulb-type LED lighting is positioned at a highest point of the circular shape.

15. The classification device of claim 1, wherein the X, Y and Z coordinates of the object are transferred to the conveying part, and the object is picked up by a conveying unit of the conveying part and conveyed to the classifying conveyor.

16. The classification device of claim 15, wherein the conveying unit picks up the object by vacuum adsorption.

17. The classification device of claim 16, wherein the conveying unit includes:
   a body;
   an arm portion including at least one arm connected to the body and configured to rotate about a vertical axis;
   a lift bar connected to the arm portion and configured to move up and down;
   an actuator configured to lift the lift bar; and
   an adsorption portion connected to a lower end of the lift bar and configured to be lifted with the lift bar.

18. The classification device of claim 17, wherein the arm portion includes:
   a first arm connected to the body to rotate about the vertical axis; and
   a second arm connected to the first arm and the lift bar to rotate about the vertical axis.

19. A classification system for sorting and classifying LED lighting according to form of housing through vision recognition from LED-mixed waste lighting having different forms of housing, the classification system comprising the classification device according to claim 1,
   wherein LED waste lighting, excluding bulb-type LED lighting conveyed to the classifying conveyor, among the LED-mixed waste lighting moving along the path of the input conveyor, is moved to a manual disassembly process.

20. A classification method of sorting and classifying LED lighting according to form of housing through vision recognition from LED-mixed waste lighting having different forms of housing, the classification method comprising:
   obtaining captured images of LED-mixed waste lighting using a plurality of cameras while moving the plurality of LED-mixed waste lighting, including bulb-type LED lighting, but having different forms of housing, along a path of an input conveyor (S10);
   searching for bulb-type LED lighting from the obtained images using an algorithm for image classification and recognition (S20);
   obtaining X and Y coordinate positions of an object classified as bulb-type LED lighting (S30);
   obtaining a Z coordinate of the object using the X and Y coordinates of the object (S40); and
   transferring the obtained X, Y and Z coordinates of the object to a conveying part to pick up the object with the X, Y and Z coordinates and convey the object to a classifying conveyor (S50),
   wherein the bulb-type LED lighting and remaining types of LED lighting are automatically sorted and separated.

* * * * *